(12) United States Patent
Oliver et al.

(10) Patent No.: US 6,713,752 B2
(45) Date of Patent: Mar. 30, 2004

(54) METHODS OF SAMPLING A SURFACE HAVING A MICRO-TEXTURE

(75) Inventors: Thomas C Oliver, Windsor, CO (US); Kevin W Nay, Fort Collins, CO (US); Brian L Hastings, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/215,737

(22) Filed: Aug. 9, 2002

(65) Prior Publication Data

US 2002/0185617 A1 Dec. 12, 2002

Related U.S. Application Data

(63) Continuation of application No. 09/429,507, filed on Oct. 28, 1999, now Pat. No. 6,455,840.

(51) Int. Cl.[7] .............................................. G06M 7/00
(52) U.S. Cl. .................................... 250/221; 250/208.1
(58) Field of Search ............................. 250/208.1, 221, 250/222.1; 345/166; 358/474, 475

(56) References Cited

U.S. PATENT DOCUMENTS

| 4,631,400 A | 12/1986 | Tanner et al. |
|---|---|---|
| 4,734,685 A | 3/1988 | Watanabe |
| 4,807,166 A | 2/1989 | Zalenski |
| 4,822,975 A | 4/1989 | Torigoe |
| 4,882,629 A | 11/1989 | Faulkerson et al. |
| 5,274,361 A | 12/1993 | Snow |
| 5,598,187 A | 1/1997 | Ide et al. |
| 5,644,139 A | 7/1997 | Allen et al. |
| 5,686,720 A | 11/1997 | Tullis |
| 5,729,008 A | 3/1998 | Blalock et al. |
| 5,744,795 A | 4/1998 | Bianchi et al. |
| 5,754,670 A | 5/1998 | Shin et al. |
| 5,825,044 A | * 10/1998 | Allen et al. ............. 235/472.01 |
| 5,994,710 A | 11/1999 | Knee et al. |
| 6,222,174 B1 | 4/2001 | Tullis et al. |
| 6,256,016 B1 | 7/2001 | Piot et al. |
| 6,281,882 B1 | 8/2001 | Gordon et al. |
| 6,297,513 B1 | 10/2001 | Oliver et al. |
| 6,438,396 B1 | * 8/2002 | Cook et al. ................. 600/310 |

FOREIGN PATENT DOCUMENTS

| EP | 0720056 A2 | 7/1996 |
|---|---|---|
| EP | 0800307 A2 | 10/1997 |
| EP | 0944237 A2 | 9/1999 |

OTHER PUBLICATIONS

Copy of Mar. 3, 2003 European Patent Office Search Report in corresponding EPO application 00112168.0 of Hewlett–Packard Co.

* cited by examiner

Primary Examiner—Que T. Le
Assistant Examiner—Eric Spears

(57) ABSTRACT

Methods of sampling a surface having a micro-texture upon which an optical navigation circuit tracks movement. An embodiment of the method comprises determining a rate for taking samples of the surface, determining an exposure level of the surface, illuminating the surface at the determined rate for taking samples, and illuminating the surface for each of the samples with pulses of light at the determined exposure level.

7 Claims, 3 Drawing Sheets

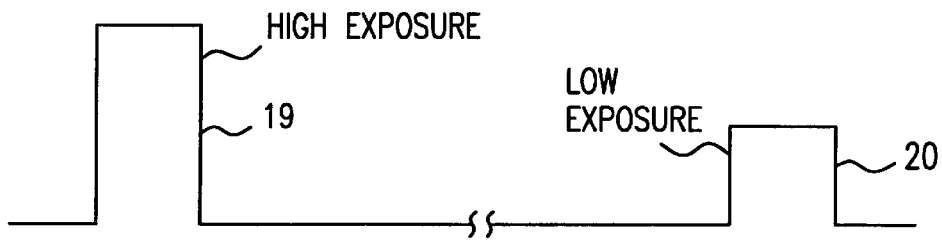
FIG. 2 (LED PULSE AMPLITUDE)
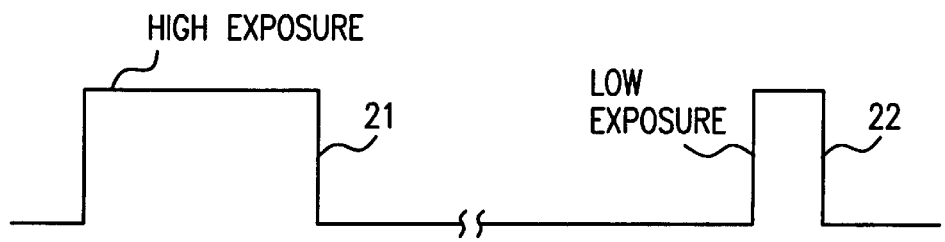
FIG. 3 (LED PULSE WIDTH)
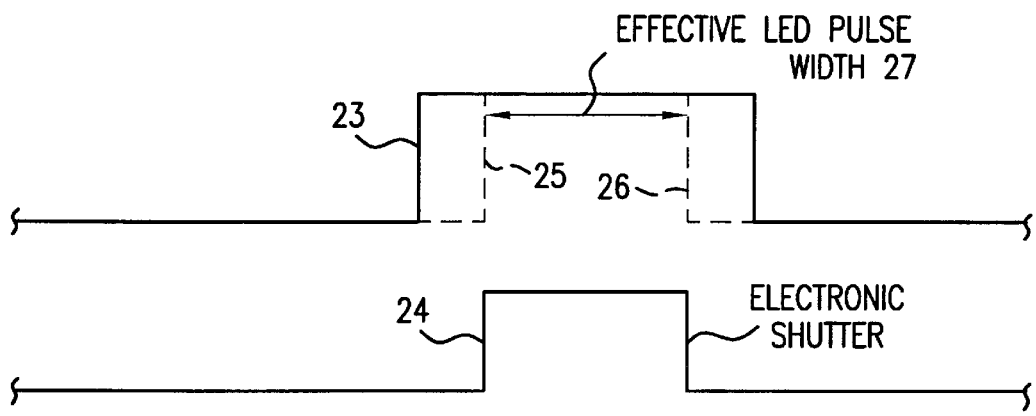
FIG. 4 (GATE LIGHT WITH SHUTTER)

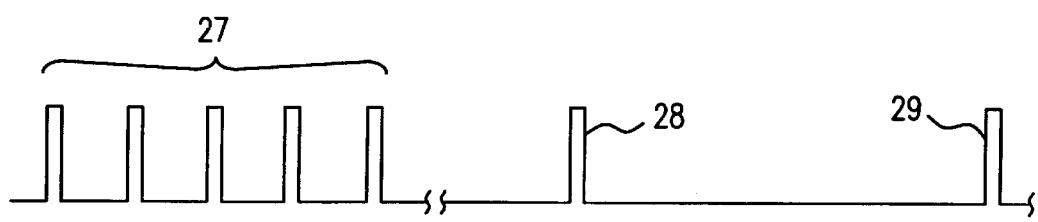
FIG. 5 (VARIBLE RATE SAMPLING)
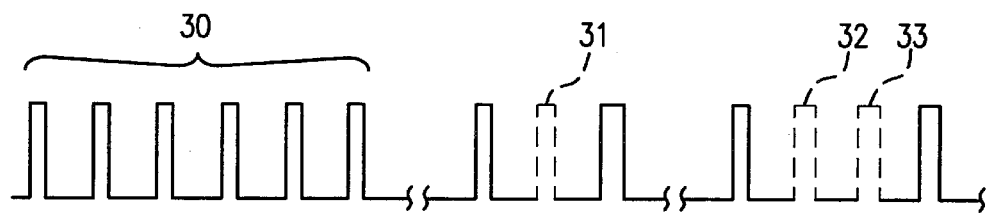
FIG. 6 (SUPPRESSED CYCLE SAMPLING)

METHODS OF SAMPLING A SURFACE HAVING A MICRO-TEXTURE

CROSS-REFERENCE TO RELATED APPLICATION

This is a continuation of Ser. No. 09/429,507 filed Oct. 28, 1999, now U.S. Pat. No. 6,455,840, issued Sep. 24, 2002 for PREDICTIVE AND PULSED ILLUMINATION OF A SURFACE IN A MICRO-TEXTURE NAVIGATION TECHNIQUE, which is hereby incorporated herein by reference for all that it discloses.

INCORPORATIONS BY REFERENCE

The subject matter of the present application is also related to that disclosed in U.S. Pat. No. 5,644,139, entitled NAVIGATION TECHNIQUE FOR DETECTING MOVEMENT OF NAVIGATION SENSORS RELATIVE TO AN OBJECT (issued Jul. 1, 1997), to that disclosed in U.S. Pat. No. 5,729,008, entitled METHOD AND DEVICE FOR TRACKING RELATIVE MOVEMENT BY CORRELATING SIGNALS FROM AN ARRAY OF PHOTO ELEMENTS (issued Mar. 17, 1998), and also to that disclosed in U.S. Pat. No. 6,281,882, entitled "SEEING EYE" MOUSE FOR A COMPUTER SYSTEM (ISSUED Aug. 28, 2001) and U.S. Pat. No. 6,297,513, entitled EXPOSURE SERVO FOR OPTICAL NAVIGATION OVER MICRO-TEXTURED SURFACES, (issued Oct. 2, 2001). In the interest of brevity, U.S. Pat. Nos. 5,644,139, 5,729,008, 6,281,882, and 6,297,513 are each hereby incorporated herein by reference.

BACKGROUND OF THE INVENTION

A recently developed technique of tracking motion and accumulating position by correlating shifted instances of a previous image with new images of surface micro-texture, such as the fibers in a sheet of paper, offers ease of use and outstanding accuracy. Devices of these sorts are described in the incorporated patent documents. A generic term for such a technique is "optical navigation", and it can reasonably be expected that it will come into ever wider use as it becomes more widely known and appreciated. Power consumption is often an issue in the types of applications that optical navigation is suited for. For example, a hand held scanner is much more attractive as a battery powered device than as one powered from the AC mains. A battery powered computer operated with a mouse that uses optical navigation is a further example.

The optical navigation technique depends upon illumination. The photosensitive elements that are used to capture the image have an "electronic shutter," in that they can be continuously exposed to the illuminated image without benefit of a mechanical shutter. Ideally, they accumulate charge or otherwise transducer from light to an electrical value only in response to a signal to do so. Unfortunately, some photosensitive devices experience bias phenomena that interfere with making measurements when the light is pulsed on after being off. These devices can still be said to have an electronic shutter, but the nature of the devices dictates that the source of light be left on. There are however, types of photosensitive devices that can be disposed in arrays suitable for optical navigation, and that both have electronic shutters and are less sensitive to the bias phenomena (e.g., photo transistors, such as used in digital cameras), allowing the power savings of pulsed light operations. Our interest herein is directed to an optical navigation system having such an array of sensors.

Consequently, early optical navigation systems simply supplied the desired illumination continuously, even though it might be needed only for five or ten percent of the time. In addition, they continuously sample at a maximum rate. Ordinarily, simplicity in a complex system is a welcome property, and in this case it is not that continuous illumination and maximal sampling do not work; they do, and quite well, too. But unfortunately illumination of the surface is performed with IR (Infra Red) LED's and is a significant consumer of battery power, which is limited. It would be desirable if the optical navigation technique could be modified to cooperate with illumination on demand without interfering with its ability to reliably keep track of where it is. A reduction in sampling rate, where possible, would also be desirable, as it is the taking of the samples that is the major consumer of power.

SUMMARY OF THE INVENTION

Method of sampling a surface having a micro-texture upon which an optical navigation circuit tracks movement, comprising determining a rate for taking samples of the surface, determining an exposure level of the surface, illuminating the surface at the determined rate for taking samples, and illuminating the surface for each of the samples with pulses of light at the determined exposure level.

BRIEF DESCRIPTION OF THE DRAWINGS

FIG. 2 is a simplified waveform diagram illustrating a method of varying exposure for the optical navigation circuit of FIG. 1 that relies upon adjusting LED drive pulse height;

FIG. 3 is a simplified waveform diagram illustrating a method of varying exposure for the optical navigation circuit of FIG. 1 that relies upon adjusting LED drive pulse width;

FIG. 4 is a simplified waveform diagram illustrating a method of varying exposure for the optical navigation circuit of FIG. 1 that relies upon adjusting effective LED drive pulse width by gating the resulting light with an electronic shutter signal;

FIG. 5 is a simplified waveform diagram illustrating a method of reducing power consumption for the optical navigation circuit of FIG. 1 by controlling the rate of sampling according to the relative velocity; and FIG. 6 is as simplified waveform diagram illustrating a method of reducing power consumption for the optical navigation circuit of FIG. 1 by suppressing regularly scheduled samples to control the rate of sampling according to the relative velocity.

DESCRIPTION OF A PREFERRED EMBODIMENT

Figure 1:
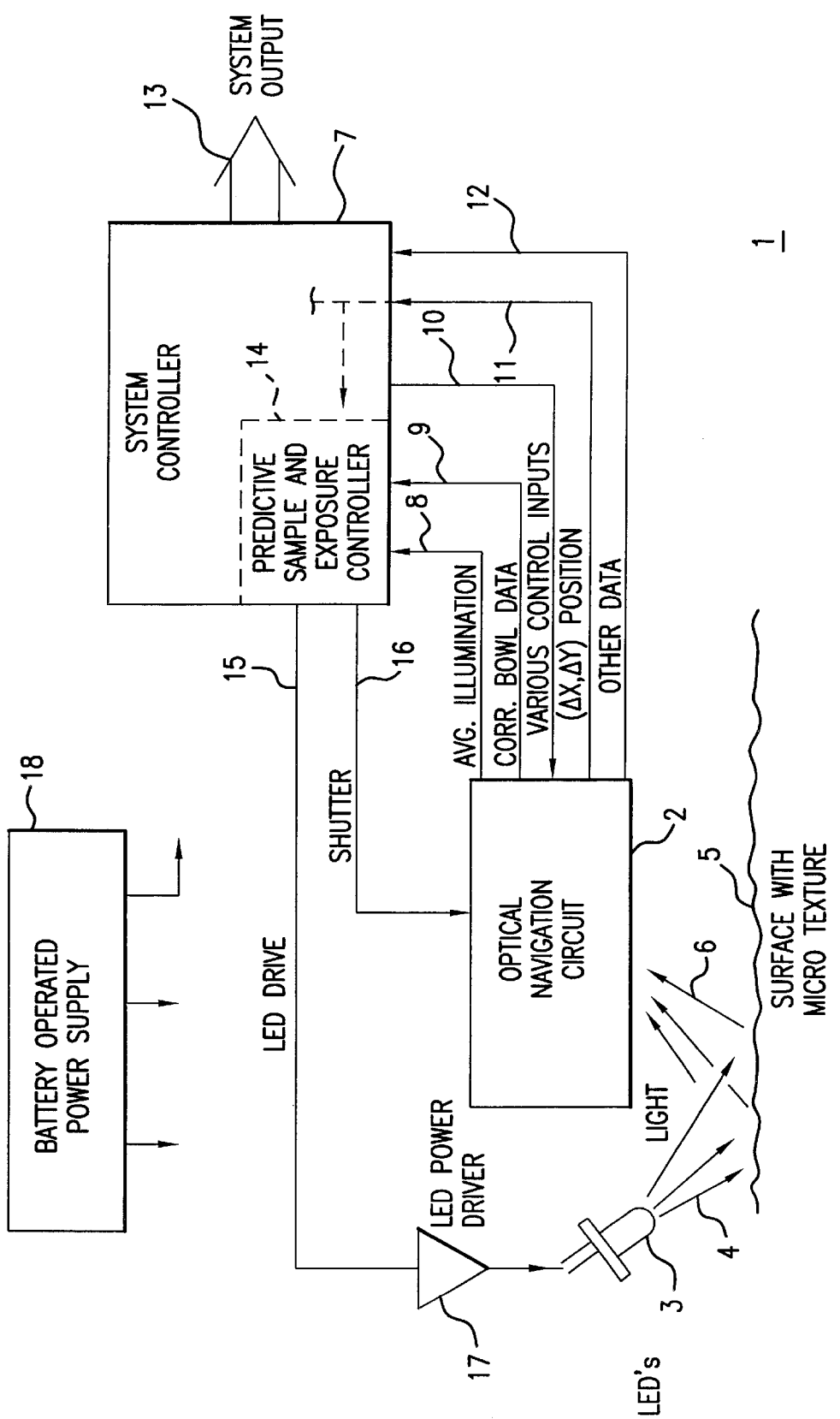
FIG. 1 is a simplified block diagram illustrating certain aspects of a system incorporating optical navigation in which there is a beneficial reduction in power consumption produced by controlling exposure with a pulsed light source.

Refer now to FIG. 1, wherein is shown a simplified block diagram 1 of a system incorporating optical navigation. In particular, it is battery powered by a battery operated power supply 18, although this is not an essential requirement; even circuits operated from the AC mains can benefit from reduced power consumption (longer component life, less heating, no fan, etc.)

An optical navigation circuit 2, which may be as described or similar to those described in the incorporated material, is proximate a surface 5 whose micro-texture is illuminated by one or more LED's 3. Light 4 from the LED's 3 is reflected from surface 5, and some of that reflected light 6 enters an aperture (not shown) of the optical navigation circuit 2. The optical navigation circuit 2 registers changes in its physical location relative to the surface 5 by tracking the apparent motion of micro-texture produced patterns in an array of photo-sensitive devices (not shown) proximate the aperture. Correlation techniques between present and past frames of pixel images are used to do this, as explained in considerable detail in the incorporated documents. We term this process of tracking motion "navigation." It will be appreciated that the optical navigation circuit 2 is an IC (Integrated Circuit) of considerable size, and that it has an amount of self-contained processing power commensurate with the task. It is not by itself an entire system, however, and its outputs (8–12) are used by an outer layer of processing for some production of some result (13).

Accordingly, note that several outputs from the optical navigation circuit 2 are applied to a system controller 7 that does produce a system output 13 (e.g., a scanned image or a position). The outputs from the optical navigation circuit 2 include an average illumination value 8, correlation bowl data 9, incremental motion signals 11 for X and Y axes, and other data 12. In addition, there are other control inputs 10 that originate with the system controller 7, such as a reset signal, and other signals for various housekeeping functions.

A word is in order about the correlation bowl data signals 9, and we pause briefly to digress. Recall that we said that navigation involves tracking apparent movement of a pixel pattern. This is realized by comparing a data frame to a reference frame. The comparison is made by shifting the contents of one frame relative to the other by one pixel in some direction and asking if the pixel values in the various locations are the same (or, is the sum of all their respective differences zero, or so). The comparison "in some direction" is performed for a pixel displacement in all directions: one up, one down, one left, one right, one up and one left, one up and one right, one down and one left, and, one down and one right. That is a total of eight comparisons. But we mustn't forget that there might have been no movement, so we also need result for no shifting. That makes nine comparison values that correspond in principle to what we have termed correlation values. The one that is the lowest represents the relative motion we are tracking. To be more robust in this process, we could go also to the next nearest pixel positions, which would raise the number of correlation values to twenty-five. The correlation process is explained in considerable detail in the incorporated documents. The "bowl" is simply the three dimensional plot of the correlation amplitudes versus the shifted position they represent. The significance of the bowl, besides indicating movement or the lack thereof, is that its shape gives rise to confidence that the navigation process is working as it is intended to. For example, if the bowl is "flat" we can presume that there is not enough contrast amongst the pixels to navigate upon. That is a serious situation that is to be avoided during navigation. Lack of excursions in the bowl may be brought on by changes in the surface as navigation proceeds, and might be correctable by changes in exposure.

To resume, then, one subsystem in the system controller 7 is of particular interest to us. It is a predictive sample and exposure controller 14, whose outputs are an LED drive signal 15 and a shutter signal 16. The LED drive signal 15 will be a pulse of variable duration or amplitude, or perhaps both. It determines the amount of emitted light 4 that is available to become reflected light 6, a portion of which may subsequently enter the aperture of the optical navigation circuit 2. The amount of reflected light that actually reaches the array of photo detectors (not shown) and that influences their output, is termed the "exposure." If there were no electronic shutter mechanism (which is perhaps unlikely, but is possible) then the light reaching the array would indeed be solely responsible for the level of exposure. More probably there is an electronic shutter whose "open time" is determined by the shutter signal 126, which is also a pulse. That pulse is applied to an LED power driver 17 that actually drives the one or more LED's 3, from which light 4 is emitted. Typically then, the resulting exposure will be a function of the LED drive signal 15 and the shutter signal 16.

Now, it is not our intent to describe any particular manner of determining what the exposure ought to be. There are conventional ways of doing this, in addition to which there is the technique described in the U.S. Patent Application entitled EXPOSURE SERVO FOR OPTICAL NAVIGATION OVER MICRO-TEXTURED SURFACES, mentioned and incorporated herein at the start of this application. It is sufficient here to point out that such exposure level determination probably relies upon average illumination 8, and preferably also upon the correlation bowl data 9. We are, however, interested in how to produce a particular exposure once it is known that a particular exposure level is desired, or that an existing exposure is to be increased or decreased.

Refer now to FIG. 2, wherein is shown a method of varying exposure with different amplitude LED drive pulses. In particular, pulse 19 has high amplitude, and produces a correspondingly higher exposure for its associated data frame (sample) that does the pulse 20 having a lower amplitude. They occur at different times, indicating that sometime during the interim the predictive sample and exposure controller 14 decided to reduce the level of exposure. In this example any electronic shutter is assume to be open during the durations of pulses 19 and 20.

A related but different method is depicted in FIG. 3. Here the situation is as described for FIG. 2, except that the varying quantity is the width of the LED drive pulses 21 and 22.

Still another exposure control method is depicted in FIG. 4. Here the LED 3 is on for the entire duration of LED drive pulse 23, but the electronic shutter is open for a lesser duration indicated by signal 24. In this example the shutter signal 24 is contained within the duration of LED drive pulse 23, but they might overlap in a different way. In any event, it is their period of simultaneous existence that produces an effective LED pulse width 27 by the shutter's effect of restricting the photo-sensitive elements to the time period indicated by dashed lines 25 and 26.

The above are ways of "throttling" the amount of exposure in a pulsed light environment, given that the predictive sample and exposure controller 14 has decided how much to "move the throttle." Pulsing the light saves power by not consuming power to fire up the LED ('s) when they are not needed between samples. Note that it does not require any change to an existing scheme for deciding how often samples are to be taken.

There is yet another technique that can be used to effect such savings, and that is to control the rate at which samples are taken. This may be practiced independently, or in conjunction with one of the exposure control techniques set out above. This technique is shown in FIGS. 5 and 6. These techniques are based on the knowledge that a certain length of time is required to take a sample frame and perform correlation, and that there is an upper limit on acceleration that can be expected, as well as on the permitted relative velocity between the navigation circuit and the surface. This knowledge can be used to reduce the sampling rate when the relative velocity is low, or zero.

Suppose, for example, it is zero. Suppose also that the reference frame in use has most or all of its ability to be shifted intact. Then we can determine with assurance a minimum sampling rate that will guarantee, even if we don't sample during some initial movement, that the next data frame will still be correlatable with that reference frame. By reducing the sampling rate to that value we save power by avoiding unneeded uses of the illuminating LED's 3. Now, if we keep track of relative velocity, we can adjust that minimum sample rate upward as needed to preserve that same advantage, although a lesser savings in power will be possible. It may be necessary to consider how many shifts the reference frame has experienced, and derate the reduction in sampling rate for that, as well.

Now consider FIG. 5. It depicts a first train of pulses 27, which represent sampling (with whatever exposure is set) at a relative high rate, perhaps even a maximal rate. This is in contrast to the situation somewhat later in time where sampling pulses 28 and 29 are issued at a considerably lower rate. In this figure the actual sampling rate is computed to be the minimum safe value, and is essentially continuously variable as a function of relative velocity.

In FIG. 6 a similar result is obtained, but through a method that may be easier to implement in some systems. K In this method the basic repetition rate of the sampling pulses is fixed, but individual sampling pulses are gated to occur or not, as a stepped approximation of the technique of FIG. 5. Thus, pulse train 30 represents a maximal sampling rate, while at a different point in time missing pulse 31 causes a lower sampling rate, while at yet another point in time missing pulses 32 and 33 cause a still lower sampling rate.

One method of accomplishing the variable rate sampling described above is to repeatedly compute a sampling rate based upon relative velocity and the associated parameter of system behavior, such as maximum allowed acceleration and maximum allowed velocity, all considered in light of the amount of apparent motion allowed between a reference frame and a data frame (that is, the amount of shifting that can be accommodated therebetween). A simplification would be to partition the range of allowable velocities into ranges, such as zero to one inch per second, one to three inches per second, three to nine inches per second, and above. A look-up table could then provide conservative safe values for the sampling rate at each of these velocities, thus saving the overhead of repeatedly re-calculating sampling rates.

For example, consider an optical navigation circuit having a forty-seven by forty-seven of photo-sensors spaced on forty micron centers. If the velocity were zero and we assumed a maximum acceleration of 0.5 g, then in order to ensure less than one pixel of motion between consecutive data frames we can allow at most a time interval of above 4 msec between frames. That is:

$$x = \text{displacement} = \tfrac{1}{2} at^2 = \text{pixel spacing}$$

Solving for t:

$$t = \sqrt{2x/a}$$

Where:

$a = 5$ m/sec$^2 = \tfrac{1}{2}$ g; and $x = 40 \ast 10^{-6}$ meters = one pixel The maximum sample rate for the above system is about 100 μsec intervals between consecutive samples at a velocity of about 0.4 meters per second. Now, from 4 msec to 100 μsec is a forty-to-one change in a sample rate, which represents quite a savings in power when the lower rate is possible. In this example one can, if desired, associate sample rates with velocities by interpolating along the line having abscissas from zero velocity to 0.4 m/sec and corresponding ordinates of 4 msec to 100 μsec. As mentioned above, one could either repeatedly solve the equation for that line or (preferably) pre-load sample rates into a look-up table indexed by velocity. With a forty-to-one ratio, it would be appropriate to partition the velocity into perhaps as many as sixteen or thirty-two different entries in the look-up table.

What is claimed is:

1. A method of sampling a surface having a micro-texture upon which an optical navigation circuit tracks movement, the method comprising:
   determining a rate for taking samples on the surface;
   determining an exposure level on the surface;
   illuminating the surface at the determined rate for taking samples; and
   illuminating the surface for each of the samples with pulses of light at the determined exposure level.

2. The method of claim 1, wherein the pulses of light have an intensity selected to produce the determined exposure level.

3. The method of claim 1, wherein the pulses of light have a duration selected to produce the determined exposure level.

4. The method of claim 1, further comprising operating in the optical navigation circuit an electronic shutter for a duration that is selected to produce the determined level of exposure.

5. A method of sampling a surface having a micro-texture for tracking movement with an optical navigation circuit, the method comprising:
   determining a sampling rate based upon the micro-texture of the surface;
   determining an exposure level based upon the micro-texture of the surface; and
   pulsing light onto the micro-texture of the surface at the determined exposure level and the determined sampling rate.

6. The method of claim 5, further comprising selecting an intensity for pulsing the light to produce the determined exposure level.

7. The method of claim 5, further comprising selecting a duration for pulsing the light to produce the determined exposure level.

* * * * *